United States Patent [19]

Brogardh et al.

[11] Patent Number: 4,880,972
[45] Date of Patent: Nov. 14, 1989

[54] FIBER-OPTIC MEASURING APPARATUS USING LUMINESCENT MATERIAL

[75] Inventors: Torgny Brogardh; Christer Ovren, both of Västerås, Sweden

[73] Assignee: ASEA Aktiebolag, Västerås, Sweden

[21] Appl. No.: 708,095

[22] Filed: Mar. 4, 1985

Related U.S. Application Data

[63] Continuation of Ser. No. 550,731, Nov. 14, 1983, which is a continuation of Ser. No. 218,949, Dec. 22, 1980.

[30] Foreign Application Priority Data

Dec. 28, 1979 [SE] Sweden .................. 7910715

[51] Int. Cl.⁴ .................. G01P 1/00; G01N 21/64; G02B 5/14
[52] U.S. Cl. .................. 250/231 R; 250/227; 250/231 P; 250/368; 250/458.1
[58] Field of Search .............. 250/458.1, 459.1, 461.1, 250/365, 361 R, 227, 368, 372, 367, 363 R, 366, 231 R, 231 P; 357/30

[56] References Cited

U.S. PATENT DOCUMENTS

| | | | |
|---|---|---|---|
| 2,353,586 | 7/1944 | Reininger | 250/458.1 |
| 2,501,560 | 3/1950 | Blau | 250/363 R |
| 4,075,493 | 2/1978 | Wickersheim | 73/355 R |
| 4,176,551 | 12/1979 | Hammer et al. | 73/355 R |
| 4,213,138 | 7/1980 | Campbell et al. | 357/30 |
| 4,245,507 | 1/1981 | Samulski | 250/337 |
| 4,281,245 | 7/1981 | Brogardh et al. | 250/205 |
| 4,356,396 | 10/1982 | Ruell et al. | 250/227 |
| 4,562,348 | 12/1985 | Brogardh et al. | 250/227 |

Primary Examiner—Carolyn E. Fields
Attorney, Agent, or Firm—Watson Cole Grindle & Watson

[57] ABSTRACT

The present invention relates to a fiber-optic measuring apparatus for measuring physical quantities, such as position, speed, acceleration, force, pressure, elongation, temperature, etc., comprising at least one optic fiber for conducting light between an electronic unit and a transducer. The transducer comprises a member having at least one luminescent material, and the position of that member with respect to the fiber end is influenced by the quantity being measured, the output signal from the transducer thus being dependent on the quantity being measured.

4 Claims, 5 Drawing Sheets

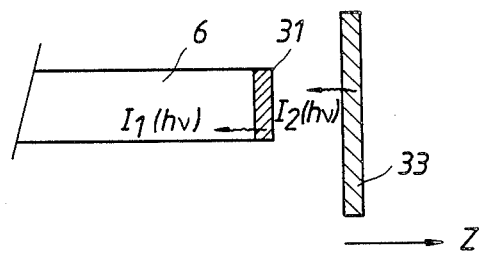
$U = f(Z)$
FIG. 4
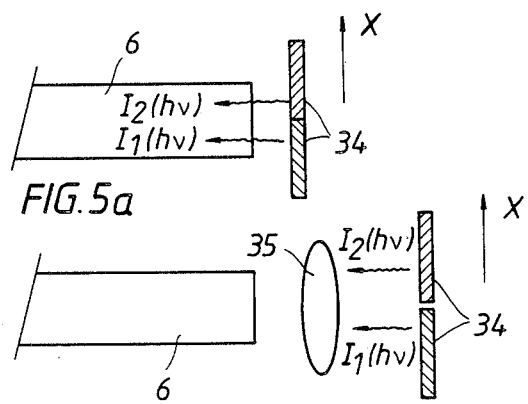
FIG. 5a
$U = f(X)$
FIG. 5b

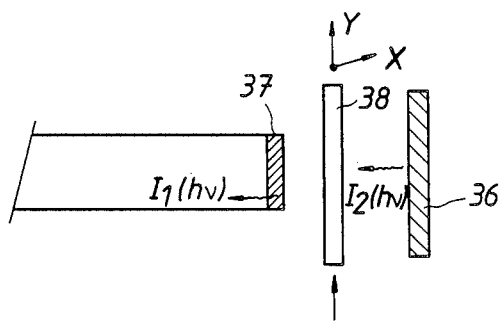
FIG. 6
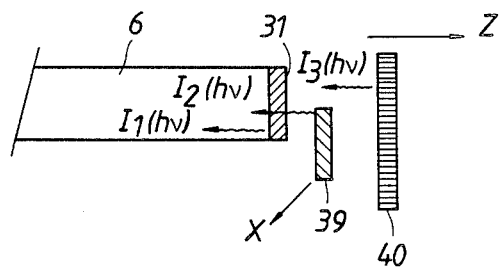
FIG. 7
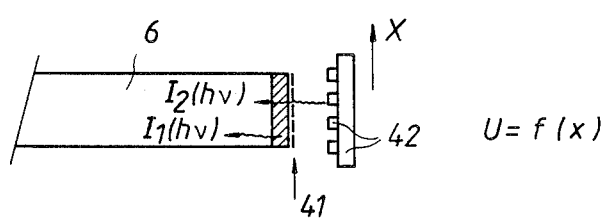
FIG. 8
$U = f(x)$
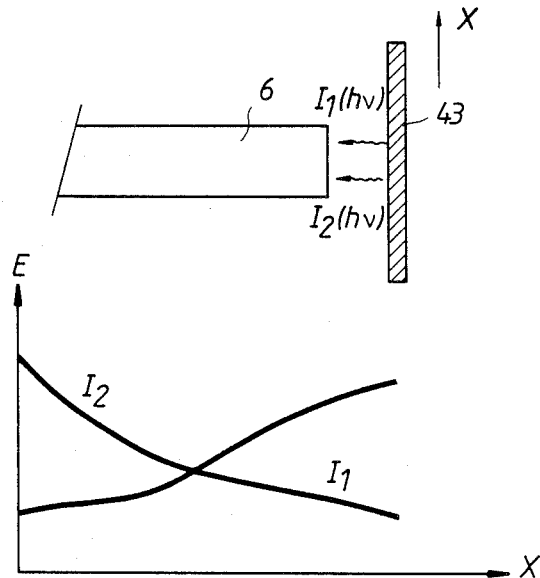
FIG. 9a
FIG. 9b

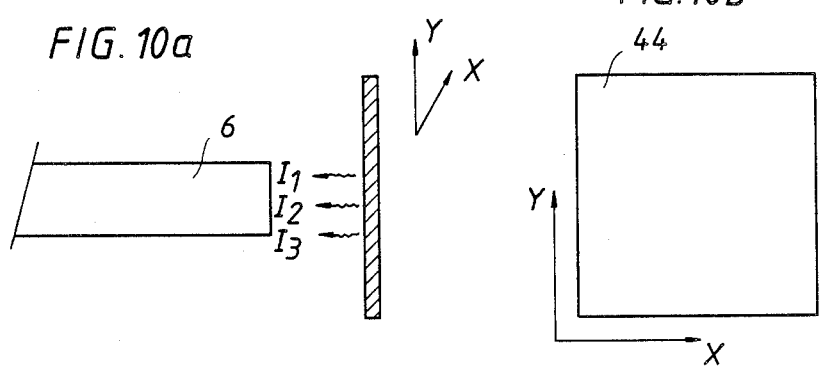
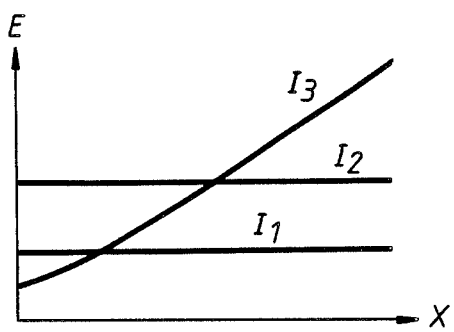
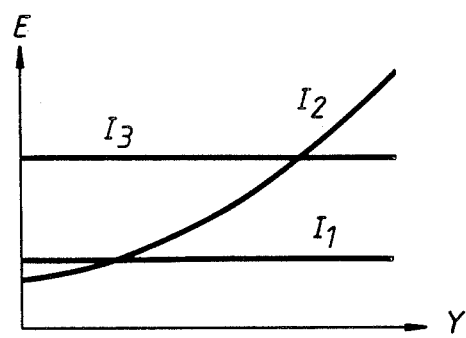
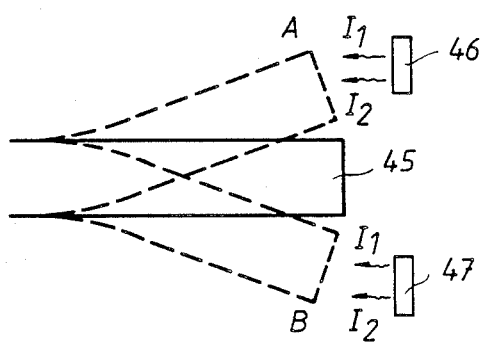

FIBER-OPTIC MEASURING APPARATUS USING LUMINESCENT MATERIAL

This application is a continuation of application Ser. No. 550,731, filed Nov. 14, 1983, which is a continuation of application Ser. No. 218,949, filed Dec. 22, 1980 both now abandoned.

BACKGROUND

1. Field of the Invention

The present invention relates to a fiber-optic measuring apparatus for measuring physical quantities, such as position, speed, acceleration, force, pressure, elongation, temperature, and more particularly to such apparatus wherein at least one optical fiber conducts light between an electronic unit E and a transducer G.

2. Prior Art

Co-pending U. S. Pat. application, Ser. No. 43,031, filed May 25, 1979, now Pat. No. 4,281,245, discloses a number of embodiments for measuring physical quantities such as position, force, pressure, temperature, etc. by fiber-optic methods utilizing the ray path through one or more interference filters, the positions of which relative to a fiber end surface may be caused to vary by the physical characteristic being measured.

SUMMARY OF THE INVENTION

The present invention represents an improvement of the device according to the above-mentioned application, the invention being characterized in that the transducer comprises a member having at least one luminescent material, and that the position of the member with respect to the fiber end is influenced by the quantity being measured, the optical output signal from the transducer thus being dependent on the quantity being measured. In other words, photo-luminescence effects are utilized to measure the position of one or more bodies relative to the end surface of a fiber, and in this way an accurate measuring apparatus is obtained which is relatively insensitive to disturbances and which has great flexibility as regards application to different types of physical quantities (position, speed, acceleration, force, elongation, temperature, etc.). By forming the system so that the measuring signal consists of a certain ratio between two signals, for example a quotient, which is the case in a preferred embodiment, the measurement may be carried out independently of damping in the fiber system induced by bending of the fiber. The systems can thus be designed without high demands on the optical and thermal stability of the light source, and in spite of this a good accuracy of measurement is obtained.

BRIEF DESCRIPTION OF THE DRAWINGS

FIG. 4 shows a device with a movable sensor;

FIGS. 5a and 5b show respective devices with a sensor which is divided in the lateral direction;

FIG. 6 shows a modified transducer with a filter;

FIGS. 7 and 8 show two different modifications of the transducer;

FIGS. 9a and 9b show respective transducers with two different radiation signals and the associated output characteristics;

FIGS. 10a and 10b show a transducer displaceable along two degrees of freedom;

FIGS. 10c and 10d show respective different output characteristics of the transducer of FIGS. 10a and 10b; and FIG. 11 shows a transducer with a vibrating fiber end.

DETAILED DESCRIPTION OF THE PREFERRED EMBODIMENTS

Figure 1:
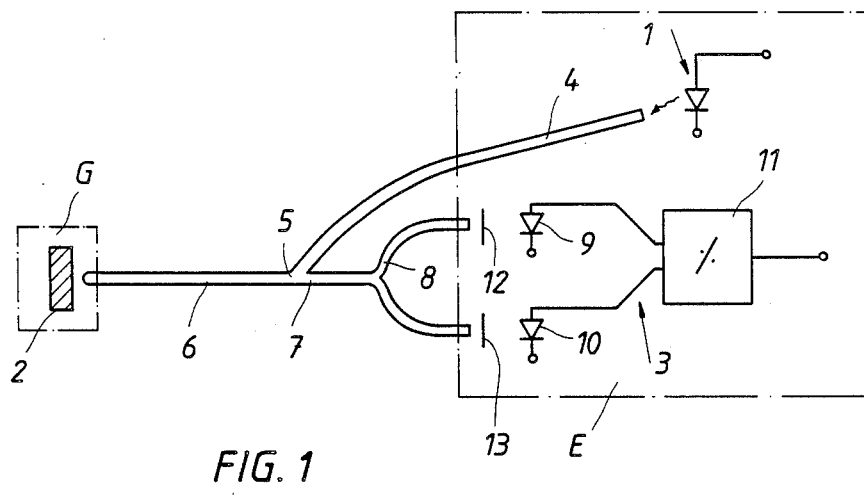
FIG. 1 shows an embodiment representing the principle of the measuring apparatus according to the invention.

In the embodiment of FIG. 1, G is the transducer, and E is the electronic unit. Light from light-emitting structure 1 is passed through a fiber system, namely, photo-optical fiber 4 via fiber branch 5 and through fiber 6 to transducer G. Transducer G comprises sensor 2, provided with at least one luminescent material which either constitutes the sensor proper or a layer on the sensor. The number of luminescent materials may also be more than one. Sensor 2 is a member that is caused to moved relative to the end of fiber 6 in accordance with the variation in the physical characteristic being measured such as the aforementioned position, speed, acceleration, force, pressure, elongation, temperature, etc. When the light signal impinges on sensor 2, a light signal is generated by photo-luminescence, which light signal is returned through the fiber system via fiber 6, fiber branch 5 and fiber 7 to branch 8, and from there to two photodiodes 9, 10 within electronic unit E. The detector system 3 within electronic unit E is combined with a signal processing system, which, for example, may be a quotient forming member 11 according to FIG. 1.

Light-emitting structure 1 may be of any arbitrary kind, for example a tungsten or halogen lamp, a gas laser, a light-emitting diode (LED), a semiconductor laser, or a Schottky diode. The spectral distribution of the light source should be adapted to the excitation spectra for the luminescent materials which are included in sensor 2.

The optical detector system is made so that the signal from at least two different wavelength intervals may be separated and supplied to signal processing system 3. Thus, in the most general case, the detector system may consist of two photodiodes 9, 10 having non-identical spectral response curves. The photodiodes may be associated with filters 12, 13 having mutually different spectra.

Figure 2A:
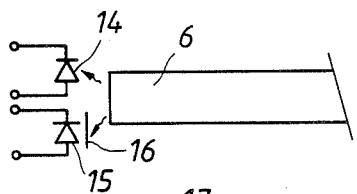
FIGS. 2a–2f show different types of detector systems used in the invention.

Different alternative detector systems are illustrated in FIGS. 2a through 2f. FIG. 2a, for example, shows a system in which the signal is supplied to two photodetectors 14, 15 from fiber end 6. One detector 15 is provided with a filter 16, which inhibits signals of a certain type, whereas the signals to detector 14 are not inhibited.

Figure 2B:
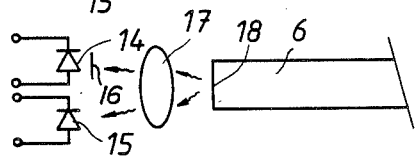

FIG. 2b shows a similar system, supplemented with a lens 17 by means of which photodiodes 14, 15 are focused at the end surface 18 of fiber 6.

Figure 2C:
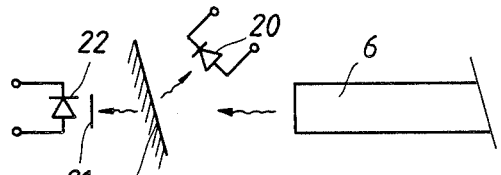
Figure 2D:
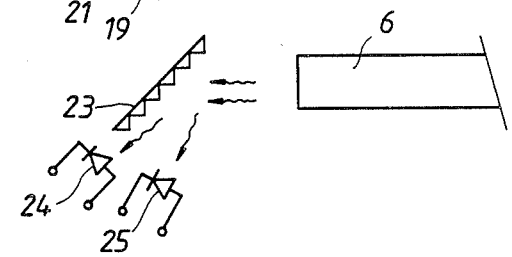
Figure 2E:
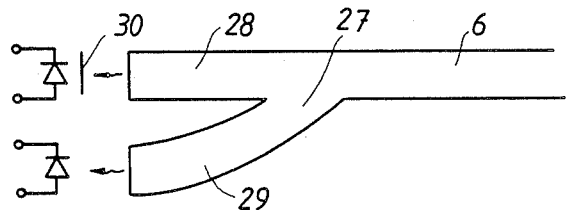

FIGS. 2c, 2d and 2e show different types of so-called beam splitter systems. FIG. 2c shows a partially transparent mirror 19 where signals from fiber 6 are partly reflected against photodiode 20, and partly transmitted via filter 21 to photodiode 22. Thus, in the same way as in F . 2a and 2b, two different signals are obtained, which signals may be processed, for example in a quotient forming member (see at 11 in FIG. 1).

FIG. 2d shows grating 23, which in different ways reflects signals coming from fiber end 6 against photodiodes 24 and 25, respectively. Further possibilities are using prisms or fiber branches (see FIG. 2e) for division of the optical signal in fiber 6, for example via branch 27 and the two fiber ends 28 and 29, respectively, whereby in the same way the signal in fiber 6 is divided into two different partial signals. One of the photodiodes is provided with filter 30.

The optical signal may also be divided by arranging an additional optical filter in the ray path before the detector system, the additional filter being transparent to the light emitted by luminescence but inhibiting to the excitation light. This is true of all the filters described above.

Figure 2F:
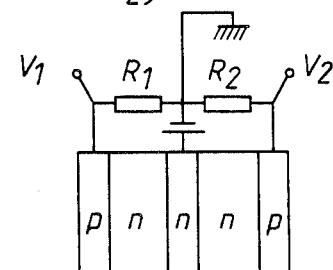
Figure 2F:
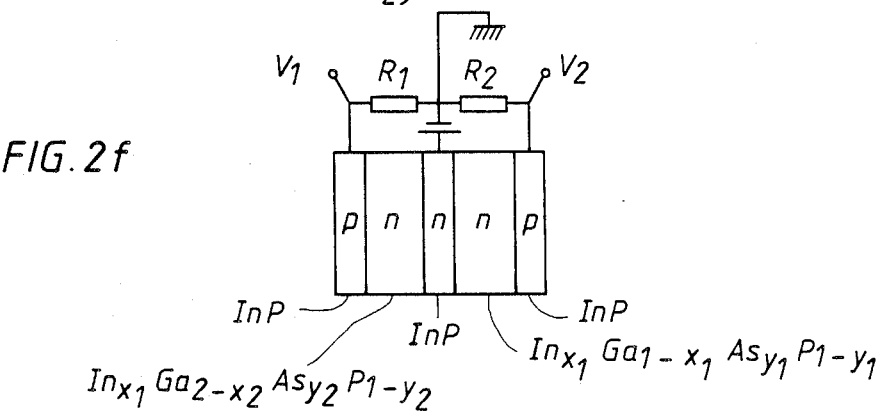

FIG. 2f shows an integrated demultiplexed structure having pn junctions of conventional type which may be used instead of the two photodiodes 14 and 15 in FIG. 2a, or in similar connections. The structure is illuminated by light emitted from the transducer and is located within electronic unit E. The electric signals may be obtained between the terminals $V_1$ and $V_2$ respectively isolated from ground by resistors $R_1$ and $R_2$. The materials included in the different layers are clear from the Figure and may consist of InP and $In_{x2}Ga_{1-x2}As_{y2}P_{1-y2}$, respectively. The middle layer includes InP, the next layer $In_{x1}Ga_{1-x1}As_{y1}$ and $P_{1-y1}$, and the outer layer InP. The two quaternary layers are given different band gaps by the choice of $x_1$, $y_1$ and $x_2$, $y_2$, respectively.

Figure 3A:
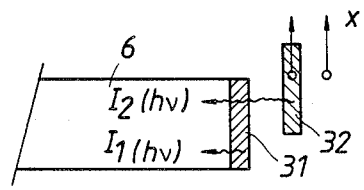
FIG. 3a shows a modification using a semiconductor and FIG. 3b illustrates the associated spectra.
Figure 3B:
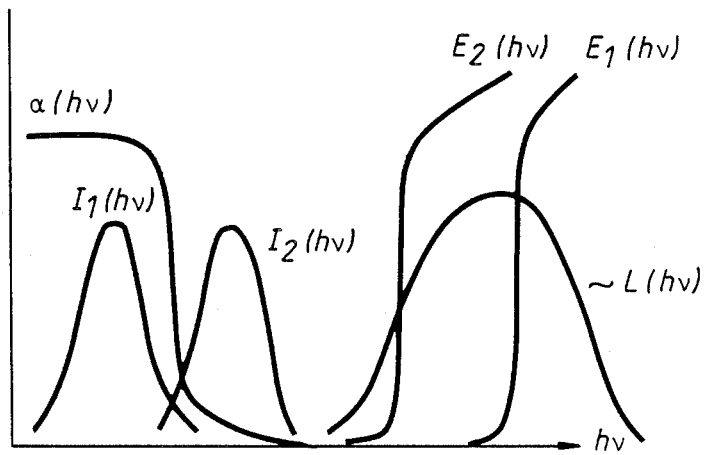

The photo-luminescence of, for example, a semiconductor material is utilized in sensor 2. One possible embodiment of sensor 2 (FIG. 1) is indicated in FIG. 3a. The end surface of fiber 6 is coated with material 31 which, when illuminated, emits light with the spectrum $I_1(h\nu)$. The excitation spectrum for this material is $E_1(h\nu)$. The light signal $L(h\nu)$ emitted from the light source thus passes partly through material 31 and may also excite an outer material 32, which is movably arranged (see arrow x) with respect to the end surface of the fiber. This latter material 32 emits light with the spectrum $I_2(h\nu)$ by photo-luminescence, which light will be coupled into fiber 6 by varying degrees in dependence on the position of the material or body 32 with respect to fiber 6, 31. The output signal U from the detector system may be expressed as $$U = \frac{\int I_2(h\nu) dh\nu}{\int I_1(h\nu)a(h\nu) dh\nu} \quad (1)$$

where $a(h\nu)$ is the transmission curve for a filter arranged in front of a detector, see for example 16 in FIG. 2a or 30 in FIG. 2e. The photo-detectors are assumed in this case to have a "gray" response. The output signal from the system is thus dependent on the position x for material 32 (FIG. 3a). The measurement system may be made insensitive to dampings of the optical signal in the system, caused for example by fiber bending, drift of the light source, and so on. The spectra of the different signals are clear from FIG. 3b in which the intensity and the absorption curves are shown on the y-axis and the photon-energy on the x-axis. The emission for material 31 is $E1(h\nu)$ and for material 32 it is $E2(h\nu)$. The various curves $L(h\nu)$, $I_1(h\nu)$, $I_2(h\nu)$ and are also clear from FIG. 3b. FIG. 3b thus shows the spectral distribution of the output signals as well as the blocking conditions, and the relation between the two signals $I_2(h\nu)$ and $I_1(h\nu)$ thus provides a measure of the position (x) of body 32.

FIGS. 3a, 4, 5a, 5b, 6 to 9a, 10a and 11 illustrate a number of different sensor configurations, which enable measurement of position in one, two or three dimensions. A possible embodiment of a limit position transducer is also discussed. A great variety of combinations of materials are possible as sensor materials. The $GaAs_xP_{1-x}$ system offers a possibility of varying the band gap and thus the excitation spectrum by varying x. By doping with N, Zn, and 0, two different luminescence spectra may be achieved. Advantageous examples of semiconductor materials for the sensor are GaP, suitably doped with Zn and 0 or Cd and 0 as well as ZnSe, suitably doped with Cu or Mn. The semiconductor material may also consist of AlP, AlAs, GaAs, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, with respectively x and y between 0 and 1, or ZnTe, ZnS, ZnO, CdTe, CdSe or CdS. The different configurations in the aforementioned Figures may be modified in several different ways; for example, in FIG. 3a a mirror may be arranged in the ray path after material 32 or replace this material, and in principle the same effect of the sensor is obtained.

FIG. 4 shows a modified embodiment of FIG. 3a for obtaining a signal $U=f(Z)$. Z corresponds to arrow Z for transferring material 33 in the direction of arrow Z. Output signal U is given according to equation (1) by the relationship between signals $I_1(h\nu)$ and $I_2(h\nu)$, that is, signals emitted from material 33 and 31, respectively, in fiber end 6. Excitation light is passed into fiber 6, and the above-mentioned signals are excited by photoluminescence upon irradiation with light from fiber 6, that is, in the same way as in connection with FIGS. 1 and 3a.

FIGS. 5a and 5b are modified embodiments of the arrangements according to FIGS. 3a and 4, in which a two part sensor or a material 34 is arranged. From the upper part of the sensor, signal $I(h\nu)$ is emitted by photoluminescence into fiber 6, and from the lower part of sensor 34 signal $I_1(h\nu)$ is emitted. Sensor 34 is displaced in the direction of arrow x, and the output signal, i.e., the ratio between the two emitted signals, is a measure of the position x. In FIG. 5b, material 34 is supplemented with lens 35 for focusing the excitation light on the material. Excitation light coming through fiber 6 passes through lens 35 and falls into sensor 34, and by photo-luminescence the two signals $I_2(h\nu)$ and $I_1(h\nu)$ are emitted, which signals are transmitted into the fiber and subsequently divided in the electronic unit. The output signal $U=f(x)$ according to equation (1) thus shows that output signal U becomes a function of position x.

In FIG. 6, movable member 38 is inserted between sensor 36 and the fiber end with photo-luminescent material 37. Material 38 is movable in the x-y directions and influences the intensity of $I_2$, i.e., the light emitted by photo-luminescence from material 36, but not influencing the light $I_1$ emitted by photo-luminescence from fiber end 37. Member 38 may be a gray filter having variable transmission over the surface and being movable in the x-y directions.

FIG. 7 shows two mutually movable bodies with photo-luminescent materials or layers of materials 39 and 40, respectively. Body 39 is movable according to arrow x, i.e., perpendicular to the plane of the paper. Body 40 is movable in the z-direction. By means of photo-luminescence, light signal $I_1(h\nu)$ is excited from end layer 31, signal $I_2$ (hv) is excited from movable body 39, and signal $I_3$ (hv) is excited from movable body 40. These three different partial signals are obtained in fiber 6. The following two signals may be obtained by photoluminescence, namely, $$U_O = \frac{\int I_2(hv)\, dhv}{\int I_1(hv)\alpha(hv)\, dhv} = f(x)$$

where the signal $U_O$ is a signal dependent on the position x, i.e., a function of position x; and $$U' = \frac{\int I_3(hv)\, dhv}{\int I_1(hv)\alpha(hv)\, dhv} = f(Z)$$

where the signal U' is a function of position Z (see FIG. 7).

FIG. 8 shows how to obtain an amplification of the movement with the aid of screen pattern 41. The sensor consists of a plate coated with luminescent material arranged in the form of bars or strips 42 and is movable in the direction of arrow x and the output signal in fiber 6 is a function U=f(x). The pattern frequency corresponds to the distance between strips 42.

FIG. 9a shows a sensor in the form of plate 43 coated with a luminescent material. In FIG. 9b, the emitted intensity E is shown on the y-axis and the movement x is shown on the x-axis. As described previously, excitation light arrives at fiber 6 and impinges on body 43, two different signals then being obtained by photoluminescence from plate 43, namely $I_1$ (hv) and $I_2$ (hv), both being a function of x. The output signal is as follows:

$$U = \frac{\int I_2(hv) \cdot dhv}{\int I_1(hv) \cdot \alpha(hv) \cdot dhv} = f(x)$$

From the differences in the two curves $I_1$ and $I_2$ it is apparent how an output signal may be obtained which is a function of the movement x (see FIG. 9a).

FIGS. 10a and 10b show sensor 44 displaceable in the x and y directions, and which is arranged upon excitation to emit light signals having three different spectra ($I_1$, $I_2$, $I_3$) into fiber end 6. The emitted intensity E is shown in FIG. 10c as a function of a displacement in the x direction and FIG. 10d as a function of a displacement in the y direction. The following two signals are obtained as functions of displacements in the x and y directions, respectively:

$$U = \frac{\int I_3(hv)\, dhv}{\int I_1(hv) \cdot \alpha(hv)\, dhv} = f(x)$$

$$U' = \frac{\int I_2(hv) \cdot dhv}{\int I_1(hv) \cdot \alpha(hv) \cdot dhv} = f(y)$$

FIG. 11 shows fiber end 45 which is capable of vibrating and which, in dependence on a quantity to be measured, is vibrated between positions A and B. The vibration frequency may be associated with the speed of movement of the fiber end. The fiber end may also be put into vibration in a magnetic field, thus obtaining a measure of the positions of the two sensors 46 and 47, respectively, at the respective end positions A and B.

The signal in position A is $U_A = \dfrac{\int A\, I_2(hv)\, dhv}{\int I_1(hv) \cdot \alpha(hv)\, dhv}$ The signal in position B is $U_B = \dfrac{\int B\, I_2(hv)\, dhv}{\int I_1(hv) \cdot \alpha(hv)\, dhv}$ If it is arranged that A≠B, for example by different doped concentrations for sensors 46 and 47, then $U_A \neq U_B$. UA =UB would mean that similar light signals were emitted in both end positions. In this way light pulses are emitted into the fiber when it is in one of its end positions. (By "light" is meant electromagnetic radiation within the wavelength range 0.1–10 u.)

What is claimed is:

1. Fiber-optic measuring apparatus for measuring physical characteristics of an object, comprising:
   a first member with at least one photoluminescent material and generating a first optical output signal from light emitted from said at least one photoluminescent material;
   a second member with at least one another photoluminescent material and generating a second optical output signal from light emitted therefrom;
   electrical processing means including light source means for generating light to be radiated onto said first and second members and means responsive to said first and second optical output signals to produce respective first and second electrical signals representative thereof, the spectral distribution of said light source means including the excitation spectra of said first and second photoluminescent materials;
   at least one optical fiber for conducting light generated by said light source means to said first and second members and for conducting said first and second optical output signals to said responsive means;
   at least one of said first and second photoluminescent materials emitting said first or second optical output signal such that the intensity thereof is a measuring signal representative of the relative movement of said first and second members in accordance with the variation in the characteristic of the object being measured, the other of said first or second output optical signal being a reference signal; and
   said electronic processing means further including means responsive to said first and second electrical signals for producing an output signal representative of the characteristic being measured.

2. Fiber-optic measuring apparatus as claimed in claim 1 wherein the relative movement of said first and second members occurs in only one dimension.

3. Fiber-optic measuring apparatus as claimed in claim 1 wherein the relative movement of said first and second members occurs in first and second dimensions.

4. Fiber-optic measuring apparatus as claimed in claim 1 wherein said first member is included at the end of said optical fiber adjacent said second member.

* * * * *